United States Patent [19]
Reber, II

[11] Patent Number: 6,014,522
[45] Date of Patent: *Jan. 11, 2000

[54] PROTECTIVE HOUSING FOR CAMERA

[75] Inventor: Frederick J. Reber, II, Honeoye Falls, N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 09/073,369

[22] Filed: May 5, 1998

[51] Int. Cl.⁷ .................................................. G03B 17/08
[52] U.S. Cl. ............................................ 396/29; 206/316.2
[58] Field of Search ....................... 396/25–29; 348/81; 206/316.2, 811

[56] References Cited

U.S. PATENT DOCUMENTS

| | | |
|---|---|---|
| 3,036,506 | 5/1962 | Andresen . |
| 4,033,392 | 7/1977 | Less ................................ 206/316.2 |
| 4,666,274 | 5/1987 | Maeno et al. . |
| 5,233,377 | 8/1993 | Kosako . |
| 5,239,323 | 8/1993 | Johnson . |
| 5,563,674 | 10/1996 | Von Holtz et al. . |

*Primary Examiner*—Howard B. Blankenship
*Attorney, Agent, or Firm*—Roger A. Fields

[57] ABSTRACT

A protective housing for a camera comprising a pouch for containing the camera which is constructed of flexible material having sufficient flexibility to allow the camera to be operated through the material when the camera is contained in the pouch, is characterized by a holder for partially enclosing the pouch which is constructed of flexible material that is less flexible than the material the pouch is constructed of in order to provide a relatively firm hand-held support for the pouch.

7 Claims, 5 Drawing Sheets

PROTECTIVE HOUSING FOR CAMERA

FIELD OF THE INVENTION

The invention relates generally to the field of photography, and in particular to a protective housing for a camera. More specifically, the invention relates to a housing that is shock-absorbent and water-resistant.

BACKGROUND OF THE INVENTION

It is known for a waterproof housing to be in the form of a generally rectangular collapsible bag or pouch made from a flexible waterproof material and which is shaped and dimensioned to enclose a camera. The flexible waterproof material has sufficient flexibility to allow the camera to be operated through the material when the camera is enclosed in the pouch.

Problem

The flexible collapsible nature of the pouch tends to make it difficult to readily hold the camera without the possibility of the pouch slipping from one's grasp.

SUMMARY OF THE INVENTION

A protective housing for a camera comprising a pouch for containing the camera which is constructed of flexible material having sufficient flexibility to allow the camera to be operated through the material when the camera is contained in the pouch, is characterized by:

a holder for partially enclosing the pouch which is constructed of flexible material that is less flexible than the material the pouch is constructed of in order to provide a relatively firm hand-held support for the pouch.

DETAILED DESCRIPTION OF THE INVENTION

The invention is disclosed as being embodied preferably in a shock-absorbent and water-resistant housing for a camera. Because the features of a shock-absorbent and water-resistant housing for a camera are generally known, the description which follows is directed in particular only to those elements forming part of or cooperating directly with the disclosed embodiment. It is to be understood, however, that other elements may take various forms known to a person of ordinary skill in the art.

Figure 1:
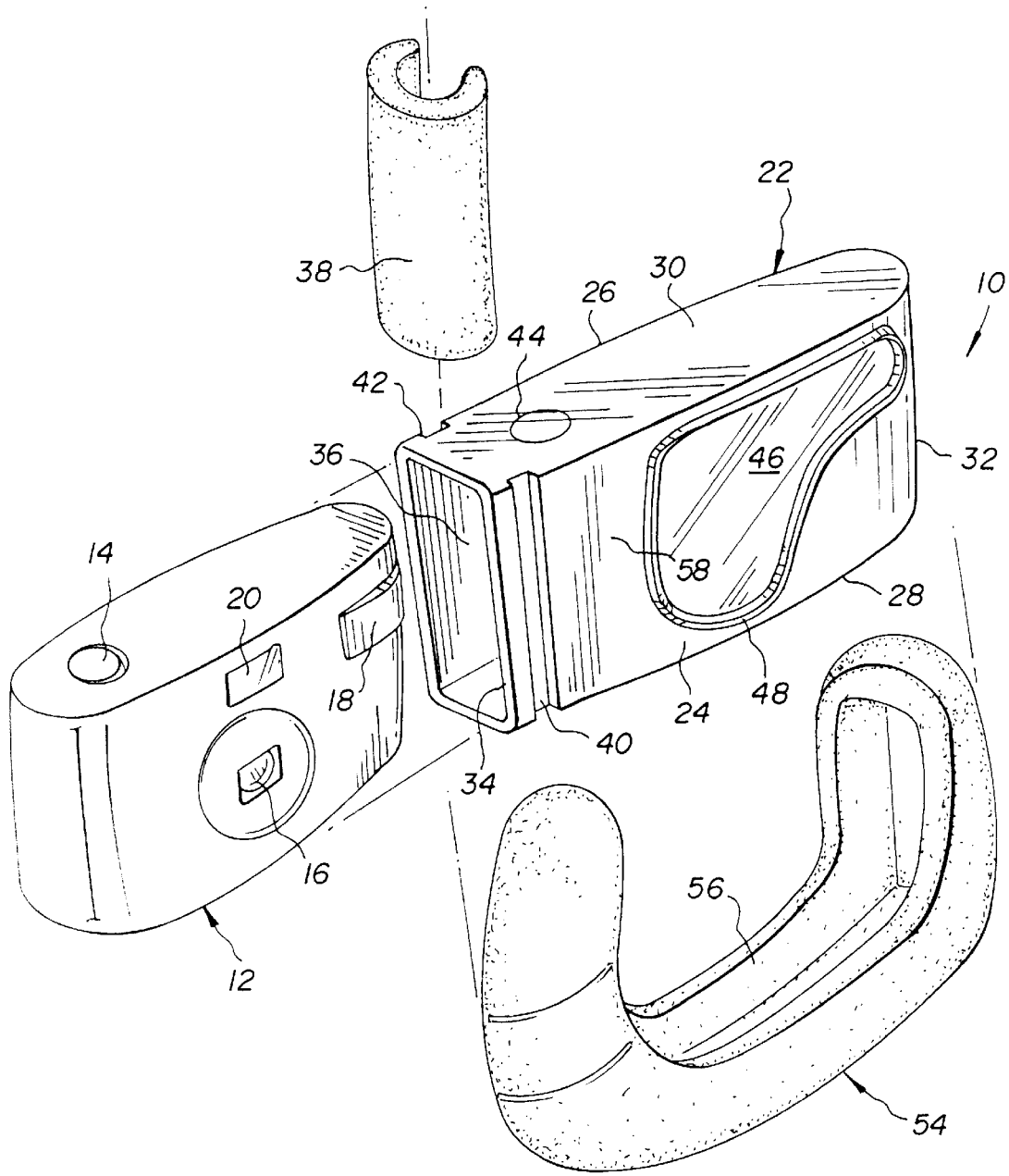
FIG. 1 is an exploded front perspective view of a protective housing for a camera according to a preferred embodiment of the invention.
Figure 2:
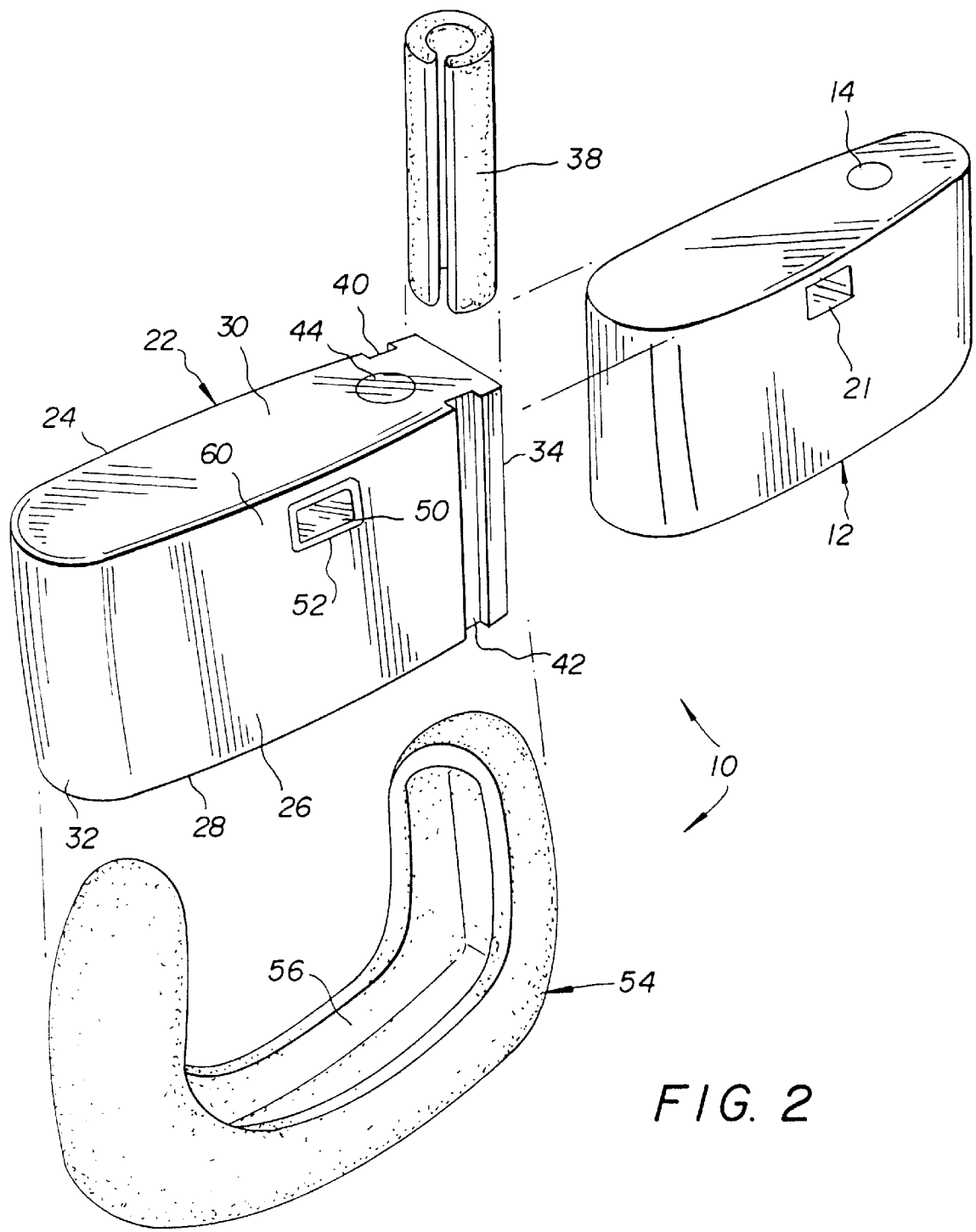
FIG. 2 is a an exploded rear perspective view of the protective housing.

Referring now to the drawings, FIGS. 1 and 2 show a protective housing 10 for a camera 12.

The camera 12 is a known type that includes a manually depressible shutter release button 14, a taking lens 16, a flash emission lens 18, and optically aligned front and rear viewfinder lenses 20, 21. See FIGS. 1 and 2.

Figure 3:
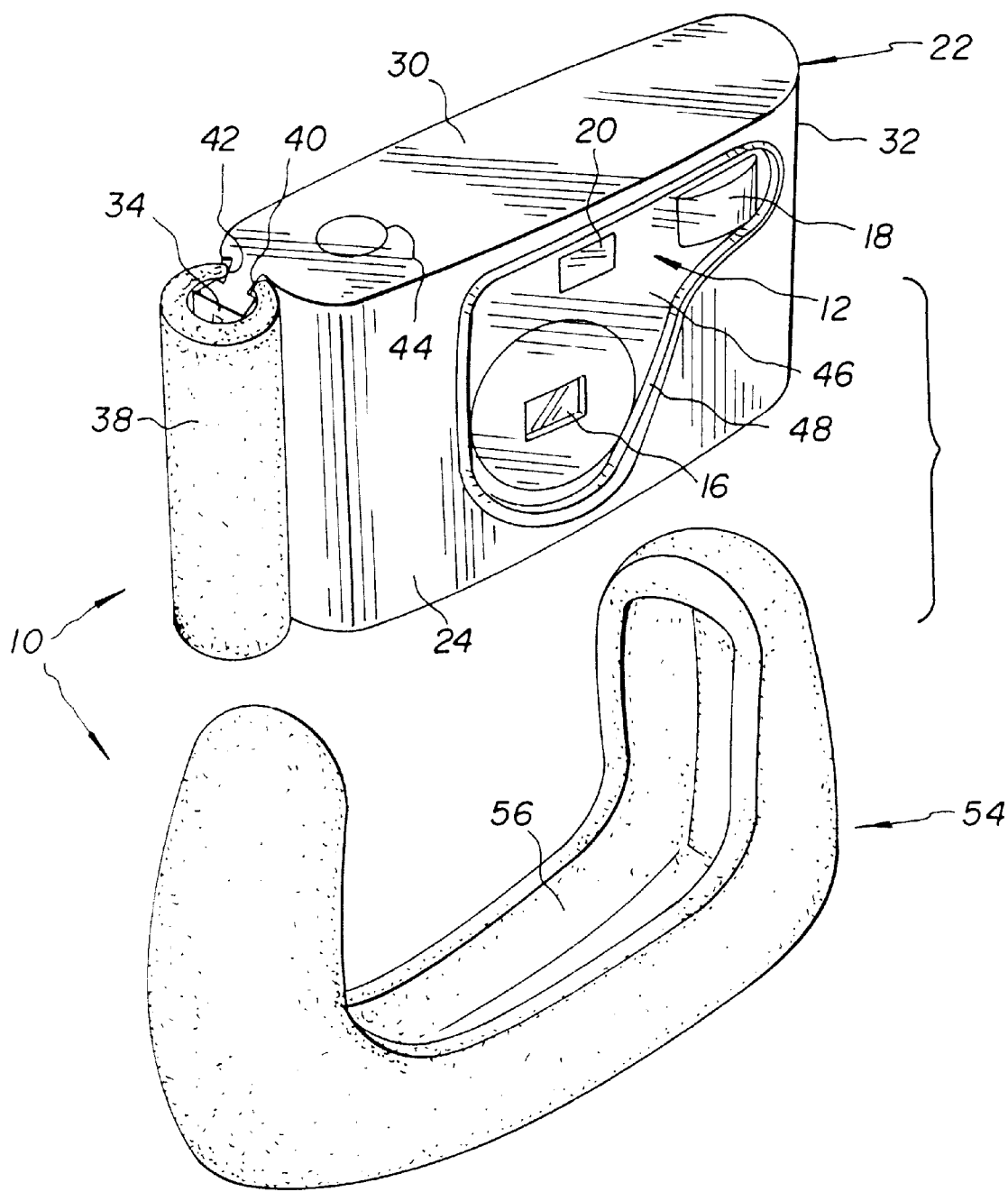
FIG. 3 is a partially assembled front perspective view of the rotective housing.

A rectangular-shaped pouch or bag 22 of the protective housing 10 has front and rear faces 24, 26 and a bottom, top and opposite ends 28, 30, 32, 34 that interconnect the front and rear faces. The one end 34 of the pouch 22 has an ingress opening 36 for receiving the camera 12 which can be collapsed to close the ingress opening. A substantially rigid c-shaped sealing clasp 38 engages the one end 34 at respective grooves 40, 42 in the front and rear faces 24, 26 of the pouch 22 when the one end is collapsed. This is done in order to seal the ingress opening 36 closed to prevent any water or moisture leakage into the ingress opening. See FIGS. 1–3. The pouch 22 is constructed of rubber or plastic flexible, resilient, waterproof material having sufficient flexibility and thinness to allow the camera 12 to be operated through the material when the camera is contained in the pouch 22. The pouch 22 has an encircled area 44 positioned immediately over the shutter release button 14 of the camera 12 to allow the encircled area to be manually depressed to similarly depress the shutter release button to take a picture. A relatively large, rigid, front transparent plastic or glass window 46 in the front face 24 of the pouch 22 is surrounded by a continuous water-tight sealing gasket 48 in front of the taking lens 16, the flash emission lens 18 and the front viewfinder lens 20 of the camera 12. A smaller, rigid, rear transparent plastic or glass window 50 in the rear face 26 of the pouch 22 is surrounded by a continuous water-tight sealing gasket 52 in front of the rear viewfinder lens 21 of the camera 12. See FIG. 2.

A u-shaped holder 54 has an elongate opening 56 for partially receiving the pouch 22 with the camera 12 inside the pouch, as shown in FIGS. 1–5. The holder 54 completely covers the bottom and opposite ends 28, 32, 34 of the pouch 22 but leaves major portions 58 and 60 of the front and rear faces 24, 26 of the pouch, including the front and rear windows 46 and 50, uncovered. See FIGS. 4 and 5. The holder 54 is constructed of rubber or plastic flexible, resilient, waterproof material that is preferably at least ten times thicker and substantially less flexible than the material the pouch 22 is constructed of in order to serve as a relatively firm hand-held support for the pouch and provide shock absorbent protection for the camera 12. The flexible material the holder 54 is constructed of is buoyant in order to be capable of floating.

Figure 4:
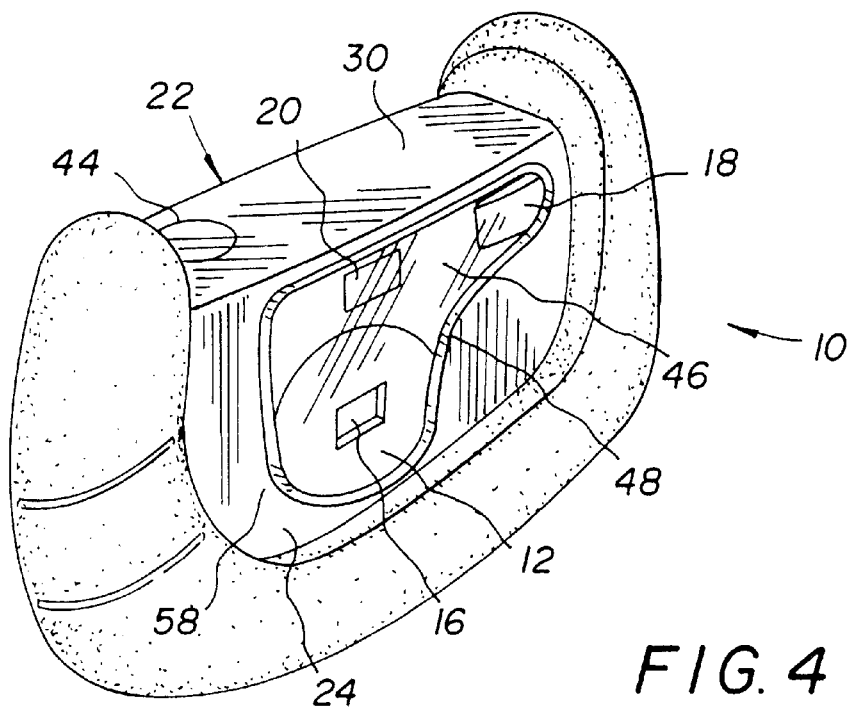
FIG. 4 is a completely assembled front perspective view of the protective housing.
Figure 5:
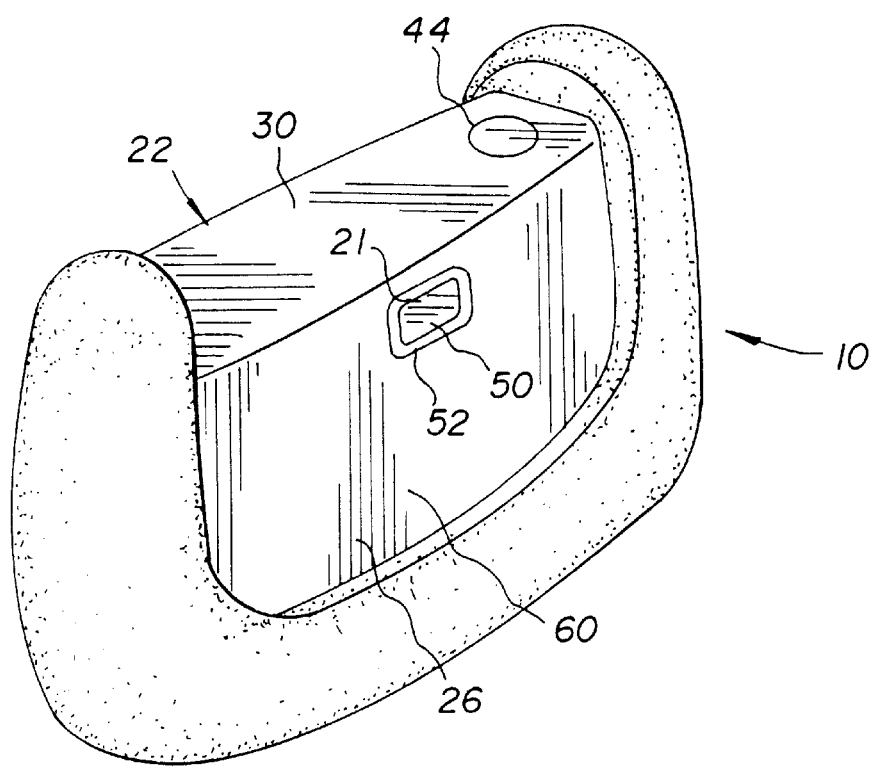
FIG. 5 is a completely assembled rear perspective view of the protective housing.

A method of assembling the protective housing 10 comprises the steps of:

1. inserting the camera 12 through the ingress opening 36 into the opened pouch 22 (FIGS. 1 and 2);
2. collapsing the one end 34 of the pouch to close the ingress opening 36 (FIG. 3);
3. engaging the sealing clasp 38 with the one end 34 at the grooves 40 and 42 (FIG. 3); and
4. placing the pouch 22 part way in the holder 54 (FIGS. 4 and 5).

The invention has been described with reference to a preferred embodiment. However, it will be appreciated that variations and modifications can be effected by a person of ordinary skill in the art without departing from the scope of the invention.

PARTS LIST 10. protective housing
12. camera
14. shutter release button
16. taking lens
18. flash emission lens
20. front viewfinder lens 21. rear viewfinder lens
22. pouch
24. front face
26. rear face
28. bottom
30. top
32. opposite end
34. one end
36. ingress opening
38. sealing clasp
40. groove
42. groove
44. encircled area
46. front window
48. sealing gasket
50. rear window
52. sealing gasket
54. holder
56. elongate opening
58. major portion
60. major portion

What is claimed is:

1. A water-resistant protective housing for a camera comprising a pouch for containing the camera which is constructed of flexible material having sufficient flexibility and thinness to allow the camera to be operated through said material when the camera is contained in said pouch, is characterized by:

a holder only partially enclosing said pouch which is constructed of flexible material that is less flexible than said material the pouch is constructed of in order to provide a relatively firm hand-held support for the pouch, which is not an integral part of said pouch but rather is a separate piece, and which has an opening configured to only partially receive said pouch with the camera inside the pouch.

2. A protective housing as recited in claim 1, wherein said pouch has front and rear faces and a bottom and opposite ends that interconnect said front and rear faces, and said holder completely covers said bottom and at least partially covers said opposite ends but leaves at least major portions of said front and rear faces uncovered.

3. A protective housing as recited in claim 1, wherein said pouch has an encircled area positioned immediately over an actuatable shutter release button of the camera when the camera is contained in the pouch in order to allow said encircled area to be manually depressed to actuate the shutter release button.

4. A protective housing as recited in claim 1, wherein said flexible material the holder is constructed of is buoyant in order to be capable of floating.

5. A water-resistant protective housing for a camera comprising a pouch for containing the camera which is constructed of flexible material having sufficient flexibility and thinness to allow the camera to be operated through said material when the camera is contained in said pouch, is characterized by:

a holder only partially enclosing said pouch which is constructed of flexible material that is less flexible than said material the pouch is constructed of in order to provide a relatively firm hand-held support for the pouch, which has an opening configured to only partially receive said pouch with the camera inside the pouch, and which is at least ten times thicker than said pouch to provide shock absorbent protection for the camera when the camera is contained in the pouch.

6. A protective housing for a camera comprising a pouch for containing the camera which is constructed of flexible material having sufficient flexibility and thinness to allow the camera to be operated through said material when the camera is contained in said pouch, is characterized by:

said pouch has one end with an ingress opening for receiving the camera and which can be collapsed to close said ingress opening;

a sealing clasp engages said one end when the one end is collapsed in order to seal said ingress opening closed; and a holder for partially enclosing said pouch which is constructed of flexible material that is less flexible than said material the pouch is constructed of in order to provide a relatively firm hand-held support for the pouch, and which covers said sealing clasp.

7. A method of assembling a protective housing for a camera, comprising the steps of:

inserting the camera into an opened pouch which is constructed of flexible material having sufficient flexibility to allow the camera to be operated through the material when the camera is contained in the pouch;

closing the pouch; and placing the pouch part way in holder which is constructed of flexible material that is less flexible than the material the pouch is constructed of in order to provide a relatively firm hand-held support for the pouch.

* * * * *